March 31, 1936.   A. E. JONSSON   2,035,893
APPARATUS FOR TREATING GRAIN, FRUIT, VEGETABLES AND THE LIKE
Filed May 5, 1934   2 Sheets-Sheet 1
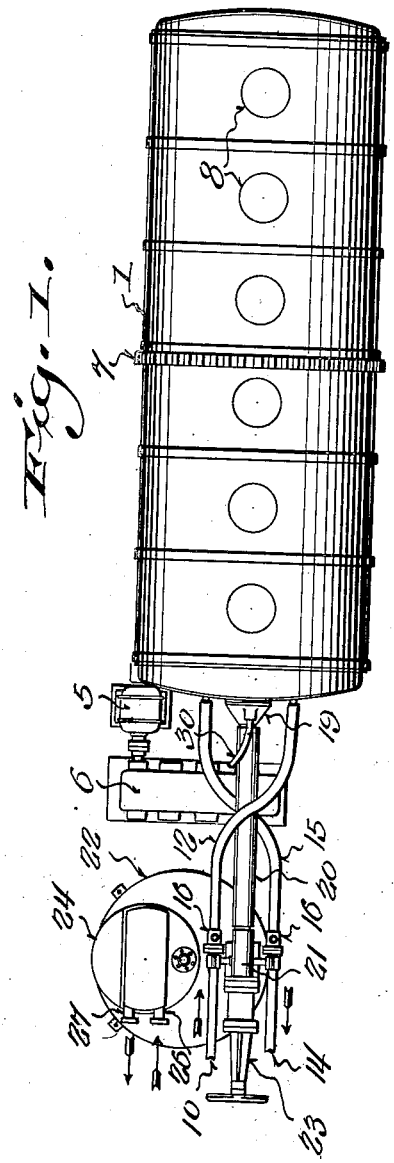
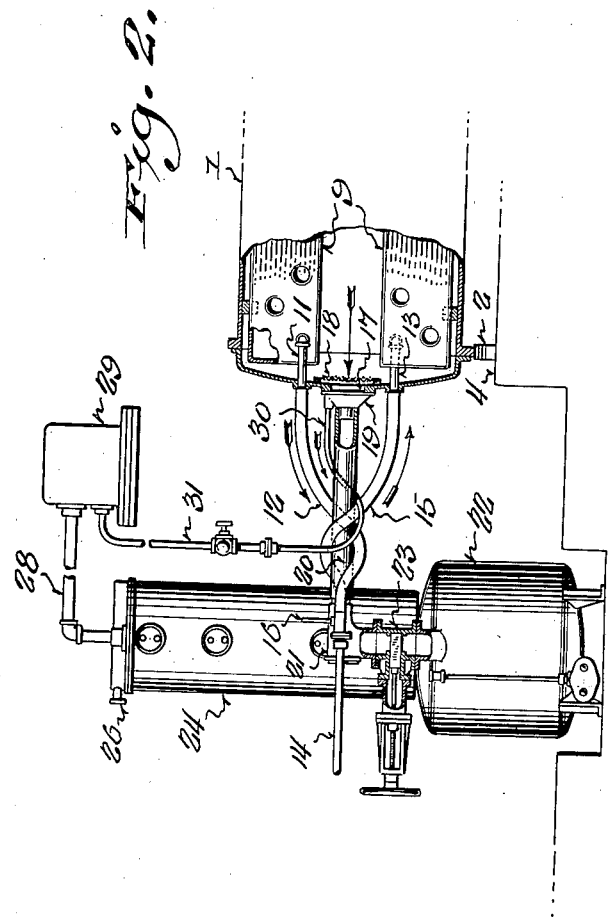
Inventor:
Augustinus E. Jonsson
By Young Young
Attorneys

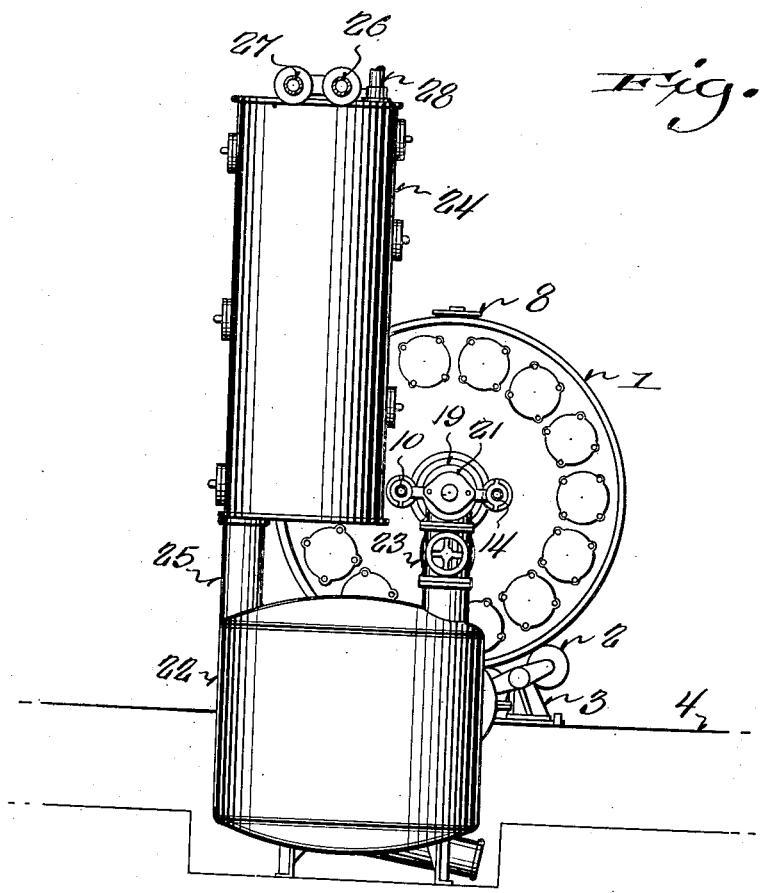

Patented Mar. 31, 1936

2,035,893

UNITED STATES PATENT OFFICE 2,035,893

APPARATUS FOR TREATING GRAIN, FRUIT, VEGETABLES, AND THE LIKE

Augustinus Edvard Jonsson, Stockholm, Sweden

Application May 5, 1934, Serial No. 724,194

6 Claims. (Cl. 99—92)

This invention pertains to apparatus for treating grain, vegetables, fruits, and the like, and more particularly to an apparatus for increasing the moisture content of the same.

The invention has primarily for its object to provide an apparatus of the foregoing character, in which the material treated is subjected to heat and agitated under reduced pressure in the presence of water or moisture, both of which are maintained substantially uniformly throughout the entire processs.

Incidental to the foregoing, a more specific object of the invention is to provide an apparatus including a closed receptacle, wherein the material to be treated is subjected to heat radiated from heating elements disposed within the receptacle, and under conditions of low pressure in the presence of steam or vapor, while being agitated, the receptacle being primarily connected with means associated with the apparatus for reducing the pressure, and with control means for maintaining a substantially uniform low pressure while preserving a proper degree of humidity within said receptacle.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as encompassed by the claims.

In the accompanying drawings is illustrated one complete example of the physical embodiment of the present invention constructed according to the best mode so far devised for the practical application of the principles thereof.

In the drawings:—

Figure 1 is a plan view of an apparatus constructed in accordance with one form of the present invention.

Figure 2 is a fragmentary side elevation, partly in section, to more clearly illustrate structural features.

Figure 3 is an end elevation.

In order that a full appreciation of the present invention may be had, the characteristics of the various materials to be treated, and the problems heretofore encountered in increasing their moisture content, will be briefly discussed. The structure of most of the material to be treated by the present apparatus is such that it offers considerable resistance to the penetration of water or moisture into the minute interior pores and fissures, thereby rendering it extremely difficult to attain even distribution of the moisture required in the material. Therefore, the common practise now employed, of merely soaking the material in water, requires a long, tedious operation, which materially reduces production, or necessitates cumbersome, bulky apparatus, and therefore materially increases cost. Furthermore, the foregoing method cannot be controlled with the desired degree of certainty, when a predetermined moisture content is desired.

To overcome the foregoing objections, the present invention contemplates an apparatus by which an entirely new method is employed, which not only reduces the time heretofore required for treating various materials, from approximately fifty hours to one or two hours, but also enables the process to be controlled to a high degree of accuracy.

As a result of the present invention, it has been determined that grains, or other materials, which are more or less impervious, and are therefore exceedingly slow to take up moisture even when soaked in water, due not only to the characteristics of the structure, but also to the occluded air, are rendered more absorptive when treated under a highly reduced pressure, inasmuch as the occluded air is withdrawn, permitting the moisture to more readily penetrate the minute pores of the shells and the kernels or interior material.

The foregoing is accomplished by the present invention, one form of which is illustrated in the accompanying drawings, in which the numeral I designates a horizontal, cylindrical drum mounted upon suitable rollers 2, which are carried by the brackets 3 supported upon a base or foundation 4. In the present instance, the drum is designed for oscillatory movement, whereby its contents are agitated during the treating process to be hereinafter described. Oscillatory movement is imparted to the drum I by means of a reversible motor 5 operating through a reduction transmission 6 connected with a ring gear 7 secured to the periphery of the drum intermediate its ends. As best shown in Figures 1 and 3, the drum is provided with a plurality of man holes 8, through which material is fed to the drum from a suitable hopper, not shown.

Mounted within the drum I, in any suitable manner, are a plurality of heating units 9, illustrated in the present instance as radiators, suitably connected with one another so that the heating medium introduced into one radiator will circulate through the remaining radiators, and be discharged from the last unit. The heating medium is introduced into the heating units through a supply pipe 10 connected with the radiator inlet pipe 11, which extends through one end of the drum 1, by a flexible hose or coupling 12. After circulating through the heating units, the heating medium is discharged through the outlet pipe 13, also connected with a discharge line 14 by a flexible conduit 15, and in order to determine the temperatures at which the heating medium enters and leaves the heating units, thermometers 16 are disposed between the supply and discharge lines 10 and 14, and the flexible conduits 12 and 15, respectively.

As best shown in Figure 2, one end of the drum 1 is provided with an opening 17, which is covered by a suitable screen 18 to prevent discharge of the material contained within the drum during oscillation of the same, and fitted to the exterior of the drum over the opening 17 is a flanged coupling 19 to which a flexible conduit 20 is secured, its opposite end being attached to an L fitting 21, which in turn communicates with the condensation tank 22, through the control valve 23.

As best shown in Figure 3, a condenser 24 is mounted above the tank 22, and is connected therewith through a communicating pipe 25. The condenser 24 is of a conventional type, provided with an internal tubing (not shown) to which a cooling medium is supplied through the inlet pipe 26, and, after circulating through the tubing, is discharged through the outlet pipe 27. A suction line 28 communicates with the upper end of the condenser 24, and is connected with a conventional vacuum pump 29 diagrammatically illustrated in Figure 2.

From the foregoing explanation, considered in connection with the accompanying drawings, it will be quite apparent that material supplied to the drum will be agitated through the oscillation of the drum, and subjected to heat radiated from the units 9 under reduced pressure created by the vacuum pump 29, which withdraws the air from the drum 1 through the conduit 20, the condensation tank 22, and the condenser 24, the flexible connections between the heat supply and the suction means permitting oscillation of the drum 1, and eliminating the necessity of swivel connections and packing glands, and stuffing boxes. However, attention is directed to the fact that such apparatus, with the exception of the control valve 23, is in itself old, and has been heretofore employed in the drying of grain. Therefore, the same forms no specific part of the present invention other than in the combination hereinafter claimed.

Considering now the salient features and operation of the present invention, material to be treated is fed to the drum 1 through the man holes 8, together with the desired quantity of water, after which the drum is sealed, and the pressure therein reduced through operation of the vacuum pump 29. Here it may be explained that the water may be added to the material before or after it is fed to the drum, and either before, during, or after reducing the pressure within the drum. The heat is then applied to the heating units 9, and when the desired pressure within the drum is obtained, the valve 23 is closed and the drum oscillated to effect agitation of its contents. Obviously, the heat radiated by the units 9 will convert the water into low pressure steam or vapor, the temperature of which must not be injurious to the material treated, and it naturally follows that such conversion will increase the pressure within the drum, when the valve 23 is closed, proportionately to the prevailing temperature within the drum. However, due to the penetration of air into the drum or system, through various minor leaks which occur, it is necessary to continuously draw off a certain amount of fluid from the system, in order to maintain the desired humidity. This may be accomplished in various ways, such as a bleed in the valve 23, or a slight opening of the same. However, inasmuch as the suction conduit 20 connects the drum with the condensation tank and condenser, it has been fund that such operation results in an unnecessarily great reduction of moisture within the drum, due to the condensation which takes place in the condenser, and, therefore, after the initial vacuum, or reduced pressure within the drum is obtained, it is preferred to entirely close the valve 23, and withdraw the fluid which eventually has entered into the drum or the system 1 through a very small flexible line 30 connected with the coupling 19, and an auxiliary suction line 31 connected directly to the vacuum pump.

As heretofore stated, after the initial high vacuum or reduced pressure is obtained through the system, and the valve 23 is closed, continuous bleeding of the system, either through the valve 23 or the lines 30 and 31 respectively, is exceedingly restricted, and only sufficient to extract sufficient fluid from the system to compensate for such air as may eventually enter the apparatus through small leaks which may occur, and therefore the amount of vapor or humidity, which is extracted from the apparatus, is so negligible as to require no consideration. It will therefore be quite apparent that the pressure and the humidity within the drum can be uniformly maintained throughout the entire treating process, to a high degree of accuracy, which is particularly desirable in determining the amount of moisture that has to be added to the material treated.

From the foregoing explanation, considered in connection with the accompanying drawings, it will be seen that a comparatively simple and highly efficient apparatus has been provided for increasing the moisture content of materials treated, in that the absorptive quality of the material is greatly increased through the reduction of pressure in the treating receptacle, causing the occluded air to be extracted from the material, thus permitting moisture, in the form of low temperature steam or vapor, to more readily penetrate the material, thereby considerably increasing production and eliminating the necessity of cumbersome tanks and apparatus required in the conventional soaking process.

Further, it will be readily appreciated that it is highly esesntial to maintain substantially uniform pressure and humidity within the treating receptacle throughout the entire process, in order to determine the amount of moisture imparted to the material, and this is accurately accomplished in the present invention by the provision of simple controllable means for continuously abstracting eventually incoming fluid from the treating receptacle, after initial reduced pressure is obtained, to compensate for leakage in the system and maintain the increased pressure constantly developed by the conversion of water into low pressure steam or vapor.

I claim:—

1. An apparatus of the class described comprising a closed treating receptacle, means for agitating the contents of said receptacle, heat radiating means positioned in said receptacle, a condenser in communication with said receptacle, means for reducing pressure within said condenser to abstract fluid from said receptacle, a valve for controlling the communication between the condenser and said receptacle, a direct communication between said receptacle and pressure reducing means, and a valve for controlling said communication.

2. An apparatus of the class described comprising a closed oscillating drum, heat radiating means positioned within said drum, a condenser, a flexible communication between said condenser and said drum, means for reducing pressure within said condenser to abstract fluid from said drum, a valve for controlling the communication between said drum and condenser, a direct flexible communication between said drum and said pressure reducing means, and a valve for controlling said communication.

3. An apparatus of the class described comprising a closed rotating drum, heat radiating means positioned within said drum, a condenser, a communication between said condenser and said drum to permit relative movement between the same, means for reducing pressure within said condenser to abstract the fluid from said drum, a valve for controlling the communication between said drum and condenser, a direct communication between said drum and said pressure reducing means for permitting relative movement between the two, and a valve for controlling said communication.

4. A combination apparatus for vegetable material comprising the combination of a closed treating receptacle, means connected to said receptacle for withdrawing fluid therefrom, and thereby reducing the pressure within the receptacle, means disposed within the receptacle for vaporizing water contained therein and distributing the moisture thus created in order to cause the same to penetrate the interior of the contained vegetable material, and control means for maintaining both the attained reduced pressure and the humidity in said receptacle.

5. A combination apparatus for vegetable material comprising the combination of a closed treating receptacle, means connected to said receptacle for withdrawing fluid therefrom and thereby reducing the pressure within the receptacle, means disposed within the receptacle for vaporizing water contained therein and distributing the moisture thus created in order to cause the same to penetrate the interior of the contained vegetable material, means connected to said receptacle for reducing the pressure within the same, and means for maintaining predetermined reduced pressure within said receptacle.

6. A combination apparatus for vegetable material comprising the combination of a closed treating receptacle, means connected to said receptacle for withdrawing fluid therefrom and thereby reducing the pressure within the receptacle, means disposed within the receptacle for vaporizing water contained therein and distributing the moisture thus created in order to cause the same to penetrate the interior of the contained vegetable material, means connected to said receptacle, for reducing the pressure within the same, and means for both maintaining predetermined reduced pressure and simultaneously preserving the attained humidity within said receptacle.

AUGUSTINUS EDVARD JONSSON.